May 17, 1938. J. SUNNEN 2,117,526
PINHOLE GAUGE
Filed Nov. 29, 1935 2 Sheets-Sheet 1

INVENTOR:
JOSEPH SUNNEN
BY Harry A. Renner
ATTORNEY

May 17, 1938.  J. SUNNEN  2,117,526
PINHOLE GAUGE
Filed Nov. 29, 1935  2 Sheets-Sheet 2

INVENTOR:
JOSEPH SUNNEN
BY Harry A. Dennen
ATTORNEY

Patented May 17, 1938

2,117,526

UNITED STATES PATENT OFFICE 2,117,526

PINHOLE GAUGE

Joseph Sunnen, Kirkwood, Mo.

Application November 29, 1935, Serial No. 52,761

7 Claims. (Cl. 33—162)

My invention has relation to improvements in gauges for determining the size of newly reamed holes, such as wrist pin holes, connecting rod bearings, etc., and it consists in the novel features of construction more fully set forth in the specification and pointed out in the claims.

The present invention is an improvement over that of my Patent No. 1,897,774, dated February 14, 1933, and consists in relatively movable and fixed elements contacting along an inclined plane so that relative, longitudinal movement will effect a separation of the elements to permit engagement at diametrically opposite points of the hole being gauged, and at the same time indicate the size thereof.

The principal object of the invention is to provide a gauge operating on the principle above referred to and at the same time embodying features of construction whereby the gauge may be applicable to a wide range of sizes without impairing its accuracy.

Further objects of the invention are, to provide a gauge that may be instantaneously set to the size desired and one wherein an instantaneous reading may be obtained, either as to oversize or undersize, when the work is applied to the same; one that is accurate to minute dimensions, such as .0001"; one that is certain in its operation, simple of construction and one that may be operated by any mechanic without difficulty.

Figure 1:
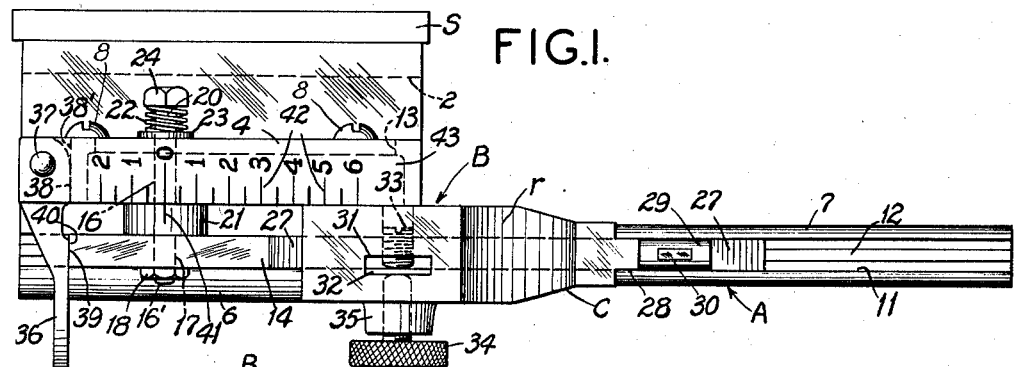
Figure 2:
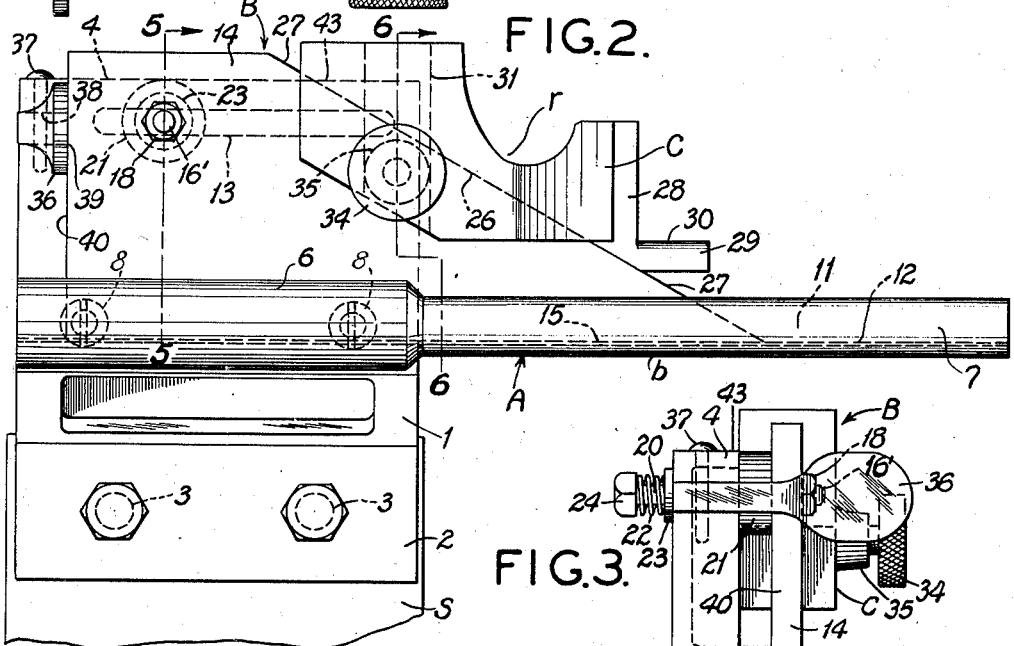
Figure 4:
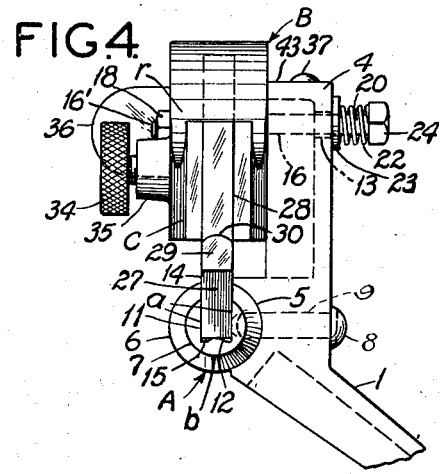
Figure 3:
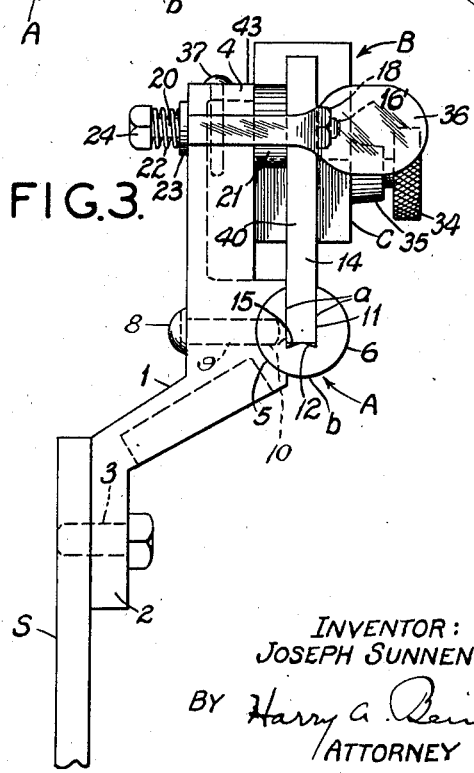
Figure 5:
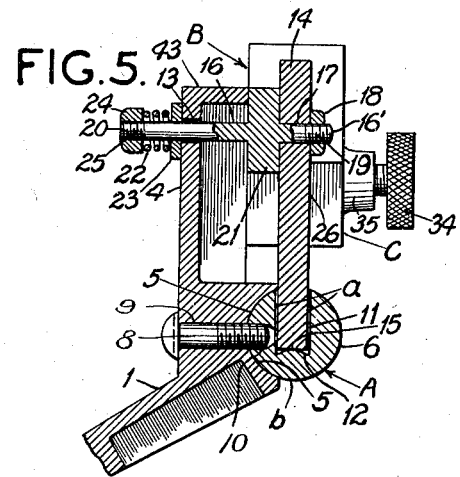
Figure 6:
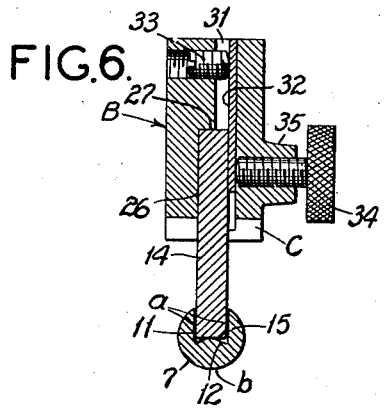
Figure 7:
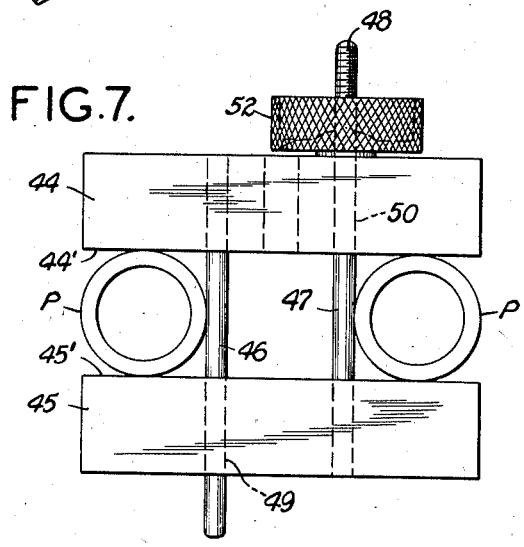
Figure 8:
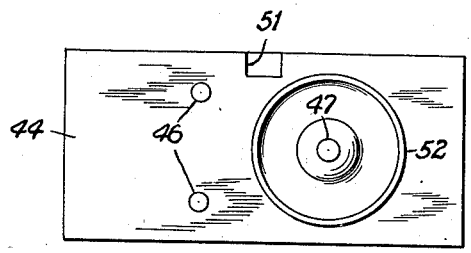

Further objects and other advantages of the invention will be better apparent from a detailed description of the same in connection with the accompanying drawings, in which:

Figure 1 is a top plan of my improved gauge; Fig. 2 is a side elevation thereof; Fig. 3 is an end elevation of the inner end of the gauge; Fig. 4 is an end elevation of the outer end of the gauge, that is, the end at which the work is applied; Fig. 5 is a vertical cross section taken on the line 5—5 of Fig. 2; Fig. 6 is a vertical cross section taken on the line 6—6 of Fig. 2; Fig. 7 is a side elevation of a gauge block used to set the gauge when reaming piston pin holes for the purpose of fitting new pins therein; Fig. 8 is a top plan of the gauge block.

Referring to the drawings, my improved gauge comprises a fixed member A and a movable member B associated with the fixed member A, the member B having a gauge member C adjustably mounted on it. The member A comprises a bracket 1, the base 2 of which is provided with bolt holes 3, 3 whereby it may be bolted to any suitable supporting member S. Preferably, the supporting member S is a part of the reaming or grinding machine that is used for grinding the holes to be measured by my improved gauge. The upper part of the bracket 1 has a plate-like member 4 offset from the base 2, and a longitudinally disposed groove 5 is formed in the lower part of said plate-like member 4 to receive the enlarged inner end 6 of a stem 7.

The stem 7 is securely fixed to the bracket by means of screws 8, 8 passed through holes 9, 9 in the member 4 and threaded into tapped openings 10, 10 in the enlarged inner end 6 of stem 7. Thus the stem 7 and bracket 1 are securely fixed together so as in effect to constitute a unitary structure. The entire length of the stem 7 and its enlarged inner end 6 is provided with a groove 11, the bottom 12 of which is slightly V-shaped, and said V-shaped bottom 12 inclines downwardly to the end of stem 7 slightly with respect to a plane tangent to the bottom surface b of the stem 7. In the present instance, the amount of this taper is .004" to every linear inch length of the stem. There is a slot 13 formed in the plate 4 near its upper edge, which slot extends in parallelism with the bottom 12 of the groove 11. A wedge-shaped plate-like member 14, whose lower edge 15 rests on the V-shaped bottom of groove 11, is disposed in said groove 11 and freely slidable back and forth on the stem 7. The member 14 is held in verticality by a guide stem 16, one end 16' of which is passed through an opening 17 in the member 14 and secured therein by means of a nut 18 screwed over the threaded extremity 19 of the stem, while the opposite end 20 of the stem traverses the slot 13 in the member 4. Between the ends 16' and 20 of the stem there is a cylindrical enlarged portion 21 which is held in contact with the member 4 by a spring 22 coiled about the end of the stem portion 20 and confined between a washer 23 and a nut 24 screwed over the threaded extremity 25 of said stem portion 20. The groove 11 is slightly wider than the thickness of the plate member 14 so that the plate may have clearance therein as shown at a, a and bear only on the bottom 12 of the groove 11 as it is slid back and forth on the stem 7 in making adjustments for gauging purpose, as will be more fully explained hereinafter.

The stem 7 forms one of the gauge members of my improved tool, the other member C comprising an adjustment block having a groove 26 formed in its under side, the bottom of said groove being inclined to correspond with the inclination of the edge 27 of the member 14, on which the block may be slid. In the present instance this inclination amounts to 30° with respect to the bottom surface $b$ of the stem 7.

Toward the forward portion of the block C there is a recess $r$ which serves as a thumb hold in adjusting the position of the block, and at the forward end of the recess $r$ is a tenon 28 for cooperation with the gauge setting block, which will be described hereinafter. Projecting forwardly from the base of the tenon 28 is a tongue 29, the upper surface 30 of which is convex. The block C is provided with a transverse slot 31 intersecting with the groove 26, and a spring 32 is securely held against one side of the slot 31 by a set screw 33, said spring being of a length so that it will bear against the member 14 when the block is in place thereon and hold the block in position on said member. However, when the block C is to be set to a gauging position it is locked to the member 14 by a thumb screw 34 traversing the tapped boss 35 on the side of the block C and impinging on the spring 32 whereby the spring may be tightly pressed against the member 14.

A lever 36 is hinged on a pin 37 within a longitudinally disposed slot 38 at the inner end of the member 4 near the top thereof, the plane surface 39 of said lever serving as a stop for the movable member 14 when said lever is held in its forward position with the rear surface 40 in contacting relation with the bottom 38' of the slot 38 (Fig. 1).

It will be observed that there is a mark 41 scored on the top of the cylindrical portion 21 of the stem 16, and that there are also graduation marks 42 (constituting a scale) inscribed along the top surface 43 of the member 4. These graduation marks are from 1 to 6 forwardly of zero and from 1 to 2 rearwardly thereof. The numerals are spaced ¼" apart, which is to indicate a distance of .001" on the gauge. Obviously, the spaces between the numerals can be further subdivided as desired. In setting the gauge for the purpose of gauging the work to a predetermined size the parts are adjusted so that the indicating mark 41 on the movable member 4 will indicate zero. Subsequent readings then taken, with the work in place on the gauge, will indicate the amount of oversize or undersize, depending on whether the mark 41 is to the rear of zero or forwardly thereof. This will be more clearly understood in connection with the description of the operation of the invention.

When the gauge is to be used for the purpose of gauging the size of piston pin holes it must, of course, be adjusted accurately for the size of hole that is to be gauged. This operation is very greatly simplified by the use of a gauge setting block such as illustrated in Figures 7 and 8. This block comprises two similar block members in the shape of parallelepipedons 44, 45 held in parallelism by triangularly arranged stems 46, 46 and 47, the first two being fixed in the member 44, and the stem 47 being fixed in the member 45, and having its projecting end provided with threads 48.

The stems 46 traverse bores 49, 49 in member 45, and the stem 47 traverses a bore 50 in the member 44. The member 44 has a vertically disposed medial recess 51 in one of its side faces, and a knurled nut 52 is provided for operation over the threaded extremity 48 of the stem 47. The spacing of the members 44 and 45 is utilized for the purpose of setting the gauge to a predetermined size for the hole that is being ground by placing piston pins P, P between the members 44 and 45 and screwing downwardly on the nut 52 so as to hold said pins tightly between the members 44 and 45. Obviously, since the opposed surfaces 44' and 45' of the members 44 and 45 are plane surfaces and are constrained in absolute parallelism with each other, the space between the surfaces and between the piston pins P, P will define the size of the pins or indicate the size of the piston pin hole to receive either of the pins P.

The operation of my invention may now be described. We will assume that new piston pins are to be fitted in pistons, the pin holes of which must be reground to accommodate the new pins, and that P, P represent the pins that are to be used. The first operation is to set the gauge setting block, comprising the members 44 and 45, as just described. The operator may now adjust the gauge members A, B and C to the size of the pins P as follows:

The first operation is to loosen the thumb screw 34 so that the block C may be easily moved along the inclined edge 27 of the member 14. He then grasps the lever 36 and the block C between the fingers and thumb of the left hand (the recess $r$ serving as a thumb hold) and slides the member B and member C together rearwardly until the rear edge 40 of member 14 engages the surface 39 of the lever 36.

This adjustment of the member 14 brings the mark 41 and the zero marking of the stationary member 1 in register as indicated (Fig. 1). While maintaining this base position of the member 14, the operator now places the gauge setting block over the stem 7 and tongue 29 with the member 44 above so that the tenon 28 will enter the recess 51. The operator then slides the member C rearwardly while maintaining the member 14 in contact with the lever 36 until further rearward movement is impossible. This arresting of further movement insures that the convex surface 30 of tongue 29 and the lower surface $b$ of stem 7 are in intimate contact with the surfaces 44' and 45', respectively, of blocks 44 and 45. In other words, the gauge is set to the size of the pin holes that are to be ground. The operator now releases his hold on the lever 36 and member C and tightens the thumb screw 34 so as to lock the member C and the member 14 together. From now on these members will operate as a unit. It is apparent that after the lever 36 is released and swung rearwardly out of the way the member 14 may be slid backwardly or forwardly without restraint of any kind whatsoever. If the operator now places a piece of work over the stem 7 and tongue 29, the hole of which is smaller than its required size, the member 14 will not be movable rearwardly sufficiently to bring the mark 41 to the zero point on the graduated scale 43. The mark 41 may stop opposite the numeral 2 of the scale, which would indicate that the hole is .002" undersize. The grinding operation will then be resumed, of course, and the hole again gauged until finally the graduation 41 will reach the zero mark on gauging the hole. The operator then knows that the hole is of proper size. Obviously, if in gauging the hole the mark 41 passes beyond the zero of the scale the operator will know that the hole is oversize the amount indicated.

In performing the operation of adjusting the position of the block C the spring 32 will hold said block against slipping, but its frictional engagement may be readily overcome by pushing the block rearwardly with the work piece in place over the tongue 29 and stem 7 until these members engage diametrically opposite points in the hole of the work piece. Another advantage served by the spring 32 is that the pressure of the thumb screw 34 is against the spring and not against the member 14 so that there is no danger of marring the surface of the member 14, or disturbing the relative position of said member and the block C in the tightening of the thumb screw.

Obviously, the adjustment of the block C to obtain the proper gauging distance between surface 30 of tongue 29 and surface b of stem 7 may be obtained in other ways, and I do not wish to be understood as limiting the invention to include the gauge setting block comprising the members 44 and 45.

Having described my invention, I claim:

1. A gauge for making inside measurements comprising a relatively fixed member and a relatively movable member, said members having cooperating contacting surfaces uniformly inclined to a true horizontal plane; a gauge member mounted on said movable member for longitudinal movement relative thereto, said gauge member and the movable member having cooperating contacting surfaces uniformly inclined to a true horizontal plane in the same direction as the above mentioned contacting surface and also inclined to said contacting surfaces of the movable and fixed member, and gauging elements on the gauge member and fixed member respectively, said elements each having a surface parallel to said horizontal plane, and a scale for indicating the relative spacing of said elements.

2. A gauge for making inside measurements, comprising a relatively fixed member, a relatively movable member, and a third member adjustably mounted on the movable member; said fixed member including a stem having an outwardly presented rectilinear gauging surface and a surface disposed opposite and downwardly inclined toward the end thereof, said movable member being slidably mounted on said inclined surface; said movable member having an outwardly presented surface inclined in the same direction as the above mentioned inclined surface, said adjustable member being slidably mounted on the latter inclined surface; an outwardly presented gauging surface on the adjustable member, and a scale for indicating the relative spacing of the gauging surfaces.

3. A gauge for making inside measurements, comprising a relatively fixed member, a relatively movable member, and a third member carried by the movable member, a gauge element on the fixed member, a gauge element on the third member in cooperating relation to the gauge element of the fixed member, said third member and said movable member having sliding contact along an inclined plane to vary the spacing of said gauge elements, said fixed member and said movable member having sliding contact along an inclined plane to effect a further variation in the spacing of the gauge members, and a scale to indicate the degree of separation of the gauge members effected by the inclined plane.

4. A gauge for making inside measurements comprising a relatively stationary gauging member, a calibrating member arranged for longitudinally sliding contact with the stationary gauging member along an inclined plane, a second gauging member mounted on the calibrating member and arranged for longitudinally sliding contact with the calibrating member along an inclined plane, gauging members having oppositely disposed gauging elements, and a scale indicating the relative space of the gauging elements.

5. A gauge for making inside measurements comprising a relatively stationary gauging member, a calibrating member arranged for longitudinally sliding contact with the stationary gauging member along an inclined plane, and a second gauging member mounted on the calibrating member and arranged for longitudinally sliding contact with the calibrating member along an inclined plane, the gauging members having oppositely disposed gauging elements.

6. A gauge for making inside measurements comprising a relatively stationary gauging member, a calibrating member arranged for longitudinally sliding contact with the stationary gauging member along an inclined plane, and a second gauging member mounted on the calibrating member and longitudinally movable relatively thereto along an inclined plane.

7. A gauge for making inside measurements comprising a relatively stationary gauging member, a calibrating member arranged for sliding contact with the stationary gauging member along an inclined plane of relatively slight inclination, and a second gauging member mounted on the calibrating member and arranged for sliding contact with the calibrating member along an inclined plane of comparatively steep inclination, the effect of said inclinations being cumulative.

JOSEPH SUNNEN.